United States Patent [19]

Needham et al.

[11] 4,004,637
[45] Jan. 25, 1977

[54] OIL RECOVERY BY IMPROVED SURFACTANT FLOODING

[75] Inventors: Riley B. Needham; Gilbert R. Glinsmann; Donald R. Wier, all of Bartlesville, Okla.

[73] Assignee: Phillips Petroleum Company, Bartlesville, Okla.

[22] Filed: Feb. 27, 1975

[21] Appl. No.: 553,689

[52] U.S. Cl. ............................................... 166/273
[51] Int. Cl.$^2$ ........................................ E21B 43/16
[58] Field of Search ........ 166/252, 273, 274, 305 R

[56] References Cited
UNITED STATES PATENTS

| 3,258,072 | 6/1966 | Froning | 166/252 |
|---|---|---|---|
| 3,414,053 | 12/1968 | Treiber et al. | 166/273 |
| 3,437,140 | 4/1969 | Foster et al. | 166/273 |
| 3,437,141 | 4/1969 | Brandner | 166/273 |
| 3,467,187 | 9/1969 | Gogarty et al. | 166/273 |
| 3,467,190 | 9/1969 | Dunlap et al. | 166/273 |
| 3,474,864 | 10/1969 | Hurd | 166/273 |
| 3,480,080 | 11/1969 | Murphy | 166/274 |
| 3,605,894 | 9/1971 | Jones | 166/273 |
| 3,648,773 | 3/1972 | Gogarty | 166/273 |
| 3,698,479 | 10/1972 | Askew et al. | 166/273 |

OTHER PUBLICATIONS

Wagner et al, "Improving Oil Displacement Efficiency By Wettability Adjustment", Petroleum Transactions, Aime, vol. 216, 1959, pp. 65-72.

*Primary Examiner*—Ernest R. Purser
*Assistant Examiner*—Jack E. Ebel

[57] ABSTRACT

The quantity of oil which can be economically recovered from an already waterflooded predominantly oil-wet formation is increased by passing a first solution through the formation to change the formation from its oil-wet to a water-wet state, passing a second solution having high interfacial tension with the oil through the formation to force the oil from the small pores of the formation into larger ones, and passing a third solution having a low interfacial tension between the third solution and the oil through the formation, optionally passing a mobility buffer-solution through the formation to prevent fingering or channeling, and finally passing the driving fluid through the formation.

12 Claims, No Drawings

OIL RECOVERY BY IMPROVED SURFACTANT FLOODING

This invention relates to the recovery of oil from oil-bearing formations. More specifically this invention relates to the recovery of oil from formations by surfactant flooding.

BACKGROUND OF THE INVENTION

Oil is usually driven out of oil-bearing formations into one or more wells by the natural pressure prevailing in said formation. This oil recovery is called the primary recovery. After these natural forces have become too small for further economical recovery, a considerable quantity of oil is still present in the formation. By injecting a fluid, frequently water or brine, into one or more injection wells some of this remaining oil can be forced out of the formation into one or more production wells. This further oil recovery is called the secondary recovery.

However, there is still a major portion of oil left in the formation after secondary recovery. Many efforts have been made to economically recover this remaining oil. One such method is known as surfactant flooding. In this method liquid solutions or dispersions containing one or more surfactants which have a very low interfacial tension against the crude oil are introduced into the formation. However a large quantity of residual oil often remains in the small pores of the formation even after surfactant flooding.

THE INVENTION

It is thus an object of this invention to provide a process for the recovery of oil from formations.

Another object of this invention is to provide an improved surfactant flooding process to recover oil from oil-bearing formations.

Other objects, advantages, features and embodiments of this invention will become apparent from the following detailed description of the invention together with the appended claims.

In accordance with this invention it has been discovered that the efficiency of oil recovery by surfactant flooding of an oil-wet formation is increased by treating the formation according to the following steps before introduction of the driving fluid:

a. introducing a first solution through at least one injection well into the formation, said first solution containing an agent capable of changing the wettability of the formation from oil-wet to water-wet;

b. introducing a second solution having a high interfacial tension to the oil via at least one injection well into the formation;

c. introducing a third solution having a low interfacial tension to the oil via at least one injection well into the formation.

This invention thus provides a method for increasing the efficiency of oil production by water flooding wherein the mobility of the oil located in the small pores is considerably increased by turning the formation from predominantly oil-wet to predominantly water-wet, wherein the oil is then driven from the small pores into the larger pores and wherein the oil is finally displaced by the drive fluid from these larger pores to the production well and out of the formation for collection.

In accordance with one embodiment of this invention a preflush solution containing sacrificial agents is introduced into the formation before the first solution is introduced. The sacrificial agents serve to reduce the dissolving of calcium from the formation and also to reduce the precipitation and adsorption of the surface active agents employed. By reducing the adsorption of the surface active agents, less of these agents can be used.

In a further embodiment of this invention a mobility buffer-solution is preferably introduced into the formation after the third solution and before the driving fluid. The buffer-solution prevents the fingering or channeling which might otherwise occur if the floor water is contacted directly with the third solution of low interfacial tension. This channeling could create areas within the formation in which no low surface tension liquid contacts the oil in the larger pores. As a result, the quantity of oil recovered from those channeled areas is reduced as compared to areas in which the third solution or low interfacial tension surfactant solution contacts the oil.

In carrying out the process of this invention a first solution is introduced into the oil-bearing formation which is capable of changing the formation from a predominantly oil-wet to a predominantly water-wet state. Such first solution is an aqueous solution or dispersion of one or more agents selected from the group consisting of lithium, sodium, potassium and ammonium petroleum sulfonates, the anions of which have an average equivalent weight in the range of about 275 to about 375; and of individual lithium, sodium, potassium and ammonium hydrocarbyl sulfonates, the hydrocarbyl entity being alkyl, aralkyl or alkaryl, the anions of said individual sulfonates having an equivalent weight of about 275 to about 375. Among these agents the presently preferred are the sodium, potassium and ammonium sulfonates, particularly the sodium petroleum sulfonates. The presently preferred range of average equivalent weight of the anions of the petroleum sulfonates and of the equivalent weight of the individual hydrocarbyl sulfonates is about 315 to about 360. Among the sodium petroleum sulfonates those having an equivalent weight in the range of about 340 to about 380 are presently preferred.

It is to be understood that the term "petroleum sulfonates" refers to a complex mixture of components including aryl sulfonates and alkaryl sulfonates. This mixture consists mostly of the monosulfonates having one $SO_3Na$ (or $-K$ or $-NH_4$) group per molecule.

The individual hydrocarbyl sulfonates defined above include, for example, the following compounds: alkylbenzene sulfonates such as sodium and potassium dodecylbenzene sulfonate ($C_{18}H_{29}SO_3Na$ or K); alkyl sulfonates, such as sodium and potassium octadecane sulfonate ($C_{18}H_{37}So_3Na$ or K); phenylalkyl sulfonates such as sodium, potassium and ammonium phenyl dodecane sulfonate ($C_{18}H_{29}SO_3NH_4$ or Na or K). The term "equivalent weight" is used herein in the usual manner. In the case of pure monosulfonates the equivalent weight equals the molecular weight whereas the equivalent weight of disulfonates would be half their molecular weight. In the case of mixtures of sulfonates such as the petroleum sulfonates, the equivalent weight refers to the average of the diverse equivalent weights.

The concentration of the treating agent in the first solution serving to change the formation from predominantly oil-wet to predominantly water-wet can vary considerably. However, sufficient amounts of this agent must be contained in the aqueous solution or dispersion thereof to satisfy the adsorption in the formation in order to turn its surface from oil-wet to water-wet. In general, solutions containing from about 1 to 10 weight percent of the treating agent (sodium petroleum sulfonate or sodium alkylbenzenesulfonate) are employed.

The quantity of the first solution introduced into the formation can vary over a suitable range so long as a sufficient amount of the treating agent is introduced into the formation to render same water-wet. In general, from 1 to about 30 volume percent of the pore volume of the formation is employed.

To determine whether or not a formation is water-wet in the meaning given above, the following procedure, a modified Amott method (Earl Amott, "Observations Relating to the Wettability of Porous Rock", Trans., AIME Vol. 216, 1959) is employed.

A fresh core sample taken from the respective formation is covered with water and centrifuged, then washed with water. The core is then covered with formation oil and again centrifuged, rinsed with oil, blotted and weighed (this weight is designated A in the following formula). Then the core is submerged in water for twenty-four hours, rinsed with water, blotted and weighed (this weight is designated B). Thereafter, the core is again centrifuged under water, blotted and weighed (this weight is designated C). Then the core is submerged in the formation oil for twenty-four hours, washed with formation oil, blotted and weighed (this weight is designated D). Thereafter, the core is centrifuged in the formation oil, washed with formation oil, blotted and weighed (this weight is designated E). In the end, E should be about equal to A. The centrifuging steps should be carried out for one hour at 33,000 times the force of gravity. If the water-by-oil displacement ratio $$\frac{B-A}{C-A}$$

is greater than the oil-by-water displacement ratio $$\frac{C-D}{C-E}$$

the formation (system) is called water-wet; otherwise it is called oil-wet.

The second solution introduced into the formation is water or an aqueous solution having a high interfacial tension to the crude oil. "High interfacial tension" merely means interfacial tension in excess of about 1 dyne/cm. Solutions having an interfacial tension to the oil of above about 5 dyne/cm are presently preferred. As a general rule, the higher the interfacial tension of this second solution to the oil, the faster the capillary equilibrium is reached. With a solution having an interfacial tension to oil of from about 20 to about 30 dyne/cm, said capillary equilibrium can be reached within several weeks for many reservoir cores.

The interfacial tension between said second solution and the oil is measured in a Du Nouy Tensiometer, in accordance with the pendant drop method, *AIME Trans*, Vol. 216, (1959), page 469, or using the spinning drop method, *Review Scientific Instr.* 13, page 6, and *Journal Colloid and Interface Science*, 23, page 99.

The second solution preferably is an aqueous solution of one or more of the salts selected from the group consisting of sodium chloride, sodium sulfate, sodium tripolyphosphate ($Na_5P_3O_{10}$) and sodium carbonate. It is presently preferred to use an aqueous solution having dissolved therein one or more salts selected from the group consisting of sodium sulfate, sodium tripolyphosphate ($Na_5P_3O_{10}$) and sodium carbonate as said second solution.

The concentration of the salts in the second solution can vary over a reasonable range but must be sufficient to effect the desired displacement of the oil from the small pores. Generally, concentrations of the salts in the range of about 0.1 to about 5.0 weight percent will result in a good displacement of the oil from the small pores into the larger pores although higher amounts can be employed.

The quantity of said second solution employed can vary over a broad range so long as the desired displacement of oil is achieved. For practical and economical purposes, however, it is presently preferred to introduce the second solution in an amount in the range of 1 to 30 percent of the pore volume of the formation.

The third solution introduced into the formation in accordance with this invention is one which has a low interfacial tension to the crude oil. Such third solution is an aqueous solution or dispersion of one or more agents selected from the group consisting of lithium, sodium, potassium and ammonium petroleum sulfonates, the anions of which have an average equivalent weight in the range of about 365 to about 475; and of individual lithium, sodium, potassium and ammonium hydrocarbyl sulfonates, the hydrocarbyl being alkyl, aralkyl or alkaryl, the anions of said individual hydrocarbyl sulfonates having an equivalent weight of about 365 to about 475. The presently preferred range of average equivalent weight of the anions of the petroleum sulfonates and of the equivalent weight of the individual hydrocarbyl sulfonates is about 395 to about 460. Among these agents the sodium, potassium and ammonium sulfonates are presently preferred, particularly the sodium petroleum sulfonates. Among the sodium petroleum sulfonates, those having an average equivalent weight of about 420 to about 480 are presently preferred.

The petroleum sulfonates are complex mixtures of various compounds including aryl sulfonates and alkaryl sulfonates. The mixtures consist mostly of monosulfonates, i.e., of molecules containing only one $—SI_3Li$, $—SO_3Na$, $—SO_3K$ or $—SO_3NH_4$ group per molecule.

The individual hydrocarbyl sulfonates defined above include, for example, the following compounds: alkylbenzene sulfonates, such as sodium and potassium docosanesulfonate ($C_{22}H_{45}SO_3Na$ or $—K$); alkylbenzene sulfonates, such as sodium or potassium eicosylbenzene sulfonate; phenylalkyl sulfonates suchh as sodium, potassium and ammonium phenyleicosane sulfonate; and naphthyl alkyl sulfonates such as sodium, potassium and ammonium naphthylhexadecanesulfonate.

The kind of sulfonates employed in the first and third solution, respectively, depends upon such conditions as the nature of the crude oil and the surface of the formation. The average equivalent weight of the sulfonate employed in the third solution, however, has to be significantly larger than the average equivalent weight of the sulfonate employed in the first solution; preferably the difference in equivalent weights of the anions of the sulfonates is at least about 40.

If desired, the third solution can additionally contain inorganic salts, crude oil, and viscosity-imparting agents such as polysaccharides, polyacrylamides, cellulosic ethers and the like. By "low" interfacial tension between the third solution and the oil is meant there is an interfacial tension of below about 0.02, preferably below about 0.01, dyne/cm. Even more preferred are third solutions having interfacial tensions between the crude oil of below about 0.001 dyne/cm. These low interfacial tensions are measured by the spinning drop method referred to above.

The preflush solution containing the sacrifical agent can be any of those well known in the art of secondary recovery. The preflush solution preferably consists essentially of water having at least one inorganic salt dissolved therein. The presently preferred salts are one or more of those selected from the group consisting of sodium chloride, sodium sulfate, sodium phosphate and sodium carbonate. The presently preferred preflush solution is an aqueous solution of an admixture of sodium sulfate, sodium phosphate and sodium carbonate wherein each of the agents is present in an amount in the range of 1000 ppm to 50,000 ppm.

The mobility buffer-solution which is introduced in a presently preferred embodiment of this invention into the formation after the third solution to prevent the effect of fingering or channeling can be any buffer-solution well known in the art. These solutions are aqueous solutions. Mobility buffer-solutions have one or more thickening agents dissolved therein and suitable thickening agents include polyacrylamides, copolymers of acrylamide, polysaccharides, polyalkylene oxides, and others well known to those skilled in this field. The mobility buffer-solution can also contain a preservative for the thickening agents which preservative is selected from the group consisting of sodium nitrite ($NaNO_2$), formaldehyde and mixtures thereof.

While the concentration of the thickeners or viscosifiers in the mobility buffer-solutions can vary over a broad range so long as sufficient quantity of the agent is introduced into the formation to obtain the desired preclusion of channeling or fingering, such agents are generally employed in an amount in the range of about 25 to about 50,000 ppm.

The quantities of the different solutions introduced into the formation can change considerably. Independent of the size of the formation, however, it is presently preferred to introduce each of the solutions (presolution, first, second, third solution and buffer-solution) in a quantity of about one to about 30 percent of the pore volume of the formation.

The invention will be more fully understood from the following calculated examples which contain preferred embodiments of the invention but which are not intended to limit its scope. For these following calculated example, a five-spot pilot oil field was used having an area of 20 acres and a sandstone type reservoir of 20 feet depth. The sandstone had a porosity of 25 percent. The pore volume thus was 100 acre feet or about 775,000 barrels.

EXAMPLE I

Into the oil-wet formation a total quantity of 208,000 pounds, or 520 pounds per acre-foot of formation, of sodium dodecylbenzenesulfonate with an equivalent weight of 348 is introduced as an aqueous solution comprising about 2.55 weight percent of said sulfonate. This first solution constitutes 3 volume percent of the formation pore volume and is introduced into the said formation in about 23 days. Thereafter, 23,280 barrels or 3 volume percent of the formation pore volume of a brine solution comprising 80,000 pounds or 1 weight percent of sodium chloride in fresh water are introduced during 23 days into the formation. Then 77,500 barrels of a third solution are made by dissolving 1,090,000 pounds of $Na_2SO_4$; 54,000 pounds of $Na_5P_3P_{10}$; 27,000 pounds $Na_2CO_3$; 136,000 pounds of $NaNO_2$; 54,000 pounds of Betz Hi-Vis acrylamide copolymer; 928,000 pounds of unreacted and refined crude oil; and 800,000 pounds of active sulfonate of an average equivalent weight of 434 with 90 percent of the sulfonate within the range of equivalent weight of 300 to 500, in fresh water to form a slug of about 10 volume percent of the formation pore volume, or about 77,500 barrels. The concentrations and quantities of the ingredients in the third solution are shown in the following table:

Table 1

| Compound | Weight Percent (Approx) | (Approx) Pounds Per Acre-ft |
|---|---|---|
| Active sulfonate | 2.6 | 2,000 |
| Fresh water | 89.7 | 68,000 |
| $Na_2SO_4$ | 3.6 | 2,700 |
| $Na_5P_3O_{10}$ | .2 | 135 |
| $Na_2CO_3$ | .1 | 68 |
| $NaNO_2$ | .5 | 340 |
| Acrylamide copolymer[1] | .2 | 135 |
| Oil | 3.1 | 2300 |

[1]Sold under the tradename Hi-Vis by Betz Laboratories, Inc., Trevose, Pa.

This slug is injected in about 78 days into the formation and it is expected that this slug will exhibit an interfacial tension less than 0.01 dyne/cm with most of the crude oils.

A driving fluid is introduced into the injection well (or wells) and oil and aqueous formation liquids are recovered from the production well (or wells). It is expected that the oil recovery efficiency is improved over a process employing only the surfactant flooding.

EXAMPLE II 160,000 barrels of fresh water, which are about 20 volume percent of the formation pore volume, containing 112,000 pounds of $Na_5P_3O_{10}$ and 56,000 pounds of $Na_2CO_3$ are introduced into the formation as a preflush sacrificial agent solution. The introduction of this solution takes about 160 days. The concentration and distribution of the ingredients of this sacrificial agent solution are given in the following Table 2:

Table 2

| Slug Component | Pounds | Approximate Concentration, % | Pounds per Acre-foot |
|---|---|---|---|
| $Na_2CO_3$ | 56,000 | 0.1 | 140 |
| $Na_5P_3O_{10}$ | 112,000 | 0.2 | 280 |

Thereafter, 17,400 barrels or 2.25 volume percent of the formation pore volume of a 2.55 weight percent sodium dodecylbenzenesulfonate solution in fresh water are introduced into the formation during about 17 days. The total weight of the sodium dodecylbenzenesulfonate is 156,000 pounds and the sulfonate has an equivalent weight of 348. Thereafter, a second solution having the same composition as the second solution of Example I is introduced into the formation in a quantity equal to that of Example I. Thereafter, 58,000 barrels or 7.5 volume percent of the formation pore volume of the third solution of Example I are injected into the formation in 58 days. The amounts of components used in this slug are given in the following Table 3. Thereafter the driving fluid is introduced into the formation and oil is recovered as explained in Example I.

Table 3

| Compound | Amount, Pounds | Approx. Pounds Per Acre-foot |
|---|---|---|
| Active sulfonate | 600,000 | 1,500 |
| Fresh water | 20,000,000 | 50,000 |
| $Na_2SO_4$ | 817,500 | 2,040 |
| $Na_5P_3O_{10}$ | 40,500 | 100 |
| $Na_2CO_3$ | 20,250 | 50 |
| $NaNO_2$ | 102,000 | 255 |
| Acrylamide copolymer[1] | 40,500 | 100 |
| Oil | 696,000 | 1,740 |

[1]Sold under the tradename Hi-Vis by Betz Laboratories, Inc., Trevose, Pa.

The efficiency of oil production of this example is believed to be approximately the same as that of Example I although less amounts of active agents have been used. This further improvement results from the introduction of the preflush sacrificial agent solution described.

EXAMPLE III

Example I is repeated. However, after the third solution, 160,000 barrels or about 20 volume percent of the pore volume of a mobility buffersolution designed to have a viscosity of 25 centipoise at 77° F are introduced into the formation. The mobility buffer-solution is prepared by thoroughly mixing fresh water with the compounds shown in the following table.

Table IV

| Compound | Amount, pounds | (Approximate) Concentration % | Pounds per Acre-foot |
|---|---|---|---|
| $Na_2SO_4$ | 2,180,000 | 3.71 | 5450 |
| $Na_5P_3O_{10}$ | 108,000 | .18 | 270 |
| $Na_2CO_3$ | 54,000 | .09 | 135 |
| $NaNO_2$ | 272,000 | .46 | 680 |
| Acrylamide copolymers[1] | 108,000 | .18 | 270 |

[1]Sold under the tradename Hi-Vis by Betz Laboratories, Inc., Trevose, Pa.

This buffer-solution further improves the efficiency of the oil recovery since it prevents or reduces channeling or fingering of the driving fluid.

Reasonable variations and modifications which will be apparent to those skilled in the art can be made in this invention without departing from the spirit and scope thereof.

We claim:

1. A process for the recovery of oil from a predominantly oil-wet formation which comprises:
   a. introducing a first solution into the formation so as to change the wettability of the oil-wet formation from predominantly oil-wet to predominantly water-wet;
   b. introducing a second solution having a high interfacial tension of at least about 1 dyne/cm to the oil into the formation;
   c. introducing a third solution having a low interfacial tension of not more than 0.02 dyne/cm to the oil into the formation;
   d. introducing a driving fluid into the formation to drive said first, second and third solutions and oil from said formation; and thereafter
   e. recovering the oil.

2. A process in accordance with claim 1 wherein the interfacial tension between said second solution and the oil is above about 5 dyne/cm and the interfacial tension between the third solution and the oil is less than about 0.001 dyne/cm.

3. A process in accordance with claim 1 wherein said first solution consists essentially of water and one or more compounds dissolved therein selected from the group consisting of lithium, sodium, potassium and ammonium petroleum sulfonates, the anions of which have an average equivalent weight in the range of about 275 to about 375, and of individual lithium, sodium, potassium and ammonium hydrocarbyl sulfonates, the hydrocarbyl thereof being selected from the group consisting of alkyl, alkaryl and aralkyl, the anions of said individual sulfonates having an equivalent weight of about 275 to about 375.

4. A process in accordance with claim 1 wherein said second solution consists essentially of water and one or more inorganic salts dissolved therein.

5. A process in accordance with claim 4 wherein said second solution consists essentially of water and at least one compound dissolved therein selected from the group consisting of sodium sulfate, sodium carbonate and sodium tripolyphosphate ($Na_5P_3O_{10}$).

6. A process in accordance with claim 1 wherein said third solution consists essentially of an aqueous solution of one or more compounds selected from the group consisting of lithium, sodium, potassium and ammonium petroleum sulfonates, the anions of which have an average equivalent weight in the range of about 365 to about 475, and of individual lithium, sodium, potassium and ammonium hydrocarbyl sulfonates, the hydrocarbyl thereof being selected from the group consisting of alkyl, alkaryl and aralkyl, the anions of said sulfonates having an equivalent weight of about 365 to about 475.

7. A process in accordance with claim 1 wherein said first solution contains low molecular weight sodium petroleum sulfonates with an average equivalent weight in the range of about 340 to about 380.

8. A process in accordance with claim 1 wherein said first solution is an aqueous solution of a sodium petroleum sulfonate having an average equivalent weight of about 340 to about 380 and said third solution is an aqueous solution of a sodium petroleum sulfonate having an average equivalent weight of about 420 to about 480.

9. A process in accordance with claim 3 wherein the range for the average equivalent weight of the anions and, respectively, the range for the equivalent weight of the anions is from about 315 to about 360.

10. A process in accordance with claim 6 wherein the range for the average equivalent weight of the anions and, respectively, the range for the equivalent weight of the anions is about 395 to about 460.

11. A process in accordance with claim 1 wherein an aqueous preflush solution is introduced into the formation before said first solution is introduced into the formation, said preflush solution comprising a compound to decrease the precipitation and adsorption of the active ingredients of the following solutions and to reduce the NaCl content of the connate water in the formation.

12. A process in accordance with claim 1 wherein a mobility buffer-solution is introduced after said third solution and before the driving fluids are introduced into the formation, said buffer-solution comprising a thickening agent.

* * * * *